May 8, 1923.

M. S. SARGENT 1,454,455

APPARATUS FOR AND METHOD OF CUTTING SEPARATOR PLATES

Filed Aug. 2, 1921

Merle S Sargent INVENTOR.

BY

ATTORNEY.

Patented May 8, 1923.

1,454,455

UNITED STATES PATENT OFFICE.

MERLE S. SARGENT, OF ASHTABULA, OHIO.

APPARATUS FOR AND METHOD OF CUTTING SEPARATOR PLATES.

Application filed August 2, 1921. Serial No. 489,231.

*To all whom it may concern:*

Be it known that I, MERLE S. SARGENT, a citizen of the United States, residing at Ashtabula, in the county of Ashtabula and State of Ohio, have invented new and useful Improvements in Apparatus for and Methods of Cutting Separator Plates, of which the following is a specification.

Some storage batteries are provided with separator plates formed of wood and these after they are shaped are usually kept in a moist condition to preserve the plates. The cutting of these plates has presented some difficulty and the present invention is designed for cutting such plates and similar materials more rapidly and evenly than has been previously accomplished.

The apparatus is illustrated in the accompanying drawings as follows:—

Figure 1:
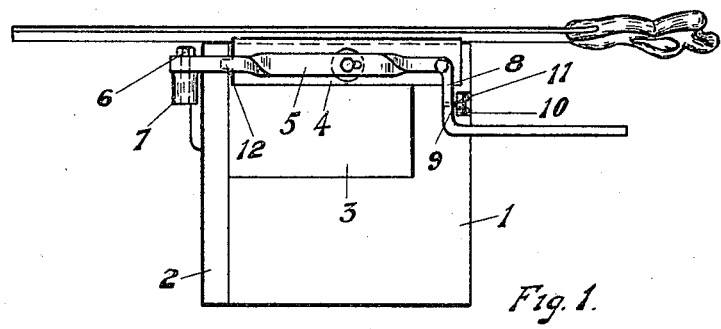

Fig. 1 shows a plan view of a cutter.

Figure 2:
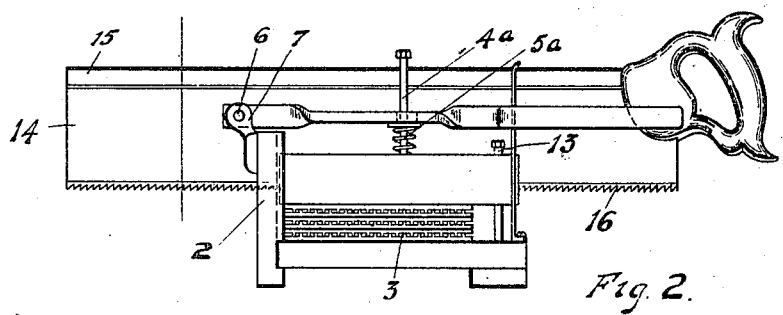

Fig. 2 an end elevation.

Figures 3, 4:
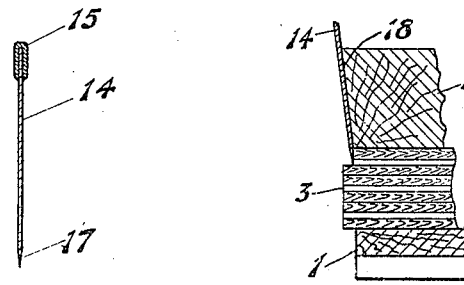

Fig. 3 a section of the saw blade.

Fig. 4 an end view of the clamp showing the guide face for the saw.

1 marks the table, 2 a guide back on the table, 3 a plurality of superposed separator plates arranged on the table, 4 a clamp block, and 5 a clamping lever, the clamping lever being pivoted at 6 on a bracket 7 secured to the back 2. The lever has an off-set 8 from which extends a pin 9, the pin 9 operating over a series of openings 11 in a resilient latch plate 10 extending upwardly from the table. The clamping block has a guide tongue 12 (see dotted lines Fig. 1) operating in a groove in the back 2 and a pin 13 extends through the block into the table guiding the opposite end of the block.

The plates are placed on the table as shown, the clamping block over the top of the plates, the lever pressed down so as to clamp the plates in position and the lever locked in position by the catch 13. A pin 4$^a$ extends up from the block 4 through the lever 5 and a spring 5$^a$ is preferably provided so as to give the block a spring pressure. It will be noted that the off-set of the lever 5 at 8 brings the operating handle away from the path of the saw 14 so that the operator may conveniently operate the saw without interference from the lever.

The back-edge of the saw has a stiffening rib or plate 15 common to saws of this type and is provided with pointed teeth 16, these teeth being bevelled on the faces 17 to form a knife-edge, these knife-edges being in alinement. The face 18 of the clamping block 4 operates as a guide for the saw. The saw having the bevelled knife-edge operates along this face without injury to the saw. Such a blade operates perfectly on the thin separator plates. In order, however, to make the cut of these plates at right angles to the table it is desirable to incline the saw blades and consequently the guide face 18 is inclined to the perpendicular so as to compensate for the tendency of the saw to cut with an inclination away from the guide face.

What I claim as new is:—

1. In a separator plate cutter, the combination of a table; a guide back; a clamp above the table, said clamp having a guide face; and a saw formed with a sharpened edge produced by bevelling at least one side of the blade as a whole, said edge being intersected by triangular notches leaving closely spaced sharp pointed teeth with knife-edge points acting on said guide face as a guide.

2. The method of cutting separator plates which consists in clamping a plurality of superposed plates and severing the plates successively with a cutter blade having a sharpened edge produced by bevelling at least one side of the blade as a whole, said edge being intersected by triangular notches leaving closely spaced sharp-pointed teeth.

In testimony whereof, I have hereunto set my hand.

MERLE S. SARGENT.